United States Patent
Sudow

(10) Patent No.: US 9,383,469 B2
(45) Date of Patent: Jul. 5, 2016

(54) METHODS AND SYSTEMS FOR NOISE-BASED STREAMER DEPTH PROFILE CONTROL

(75) Inventor: Gustav Goran Mattias Sudow, Solna (SE)

(73) Assignee: PGS Geophysical AS, Oslo (NO)

( * ) Notice: Subject to any disclaimer, the term of this patent is extended or adjusted under 35 U.S.C. 154(b) by 1052 days.

(21) Appl. No.: 13/460,214

(22) Filed: Apr. 30, 2012

(65) Prior Publication Data

US 2013/0286772 A1 Oct. 31, 2013

(51) Int. Cl.
*G01V 1/38* (2006.01)

(52) U.S. Cl.
CPC ............ *G01V 1/3826* (2013.01); *G01V 1/3843* (2013.01)

(58) Field of Classification Search
CPC .......................... G01V 1/3843; G01V 1/3826
USPC .......................................................... 367/16
See application file for complete search history.

(56) References Cited

U.S. PATENT DOCUMENTS

| | | | |
|---|---|---|---|
| 2,838,731 A | 6/1958 | Cruzan et al. | |
| 3,182,250 A | 5/1965 | Mayes | |
| 4,298,840 A | 11/1981 | Bischoff et al. | |
| 4,617,518 A | 10/1986 | Srnka | |
| 6,144,342 A | 11/2000 | Bertheas et al. | |
| 7,142,481 B1 | 11/2006 | Metzbower et al. | |
| 7,191,063 B2 | 3/2007 | Tompkins | |
| 7,327,864 B2 | 2/2008 | Deaven et al. | |
| 7,593,815 B2 | 9/2009 | Willen et al. | |
| 7,671,598 B2 | 3/2010 | Ronaess et al. | |
| 7,737,698 B2 | 6/2010 | Tenghamn et al. | |
| 7,755,970 B2* | 7/2010 | Welker | G01V 1/3826 367/15 |
| 7,800,976 B2 | 9/2010 | Stokkeland et al. | |
| 7,834,632 B2 | 11/2010 | Tenghamn et al. | |
| 8,098,542 B2 | 1/2012 | Hillesund et al. | |
| 2008/0192570 A1 | 8/2008 | Tenghamn et al. | |
| 2009/0262601 A1 | 10/2009 | Hillesund et al. | |
| 2010/0017156 A1 | 1/2010 | Ziolkowski et al. | |
| 2010/0128561 A1* | 5/2010 | Meldahl | G01V 1/3826 367/16 |
| 2010/0172205 A1* | 7/2010 | Hillesund | G01V 1/38 367/15 |
| 2010/0315088 A1 | 12/2010 | Ziolkowski et al. | |
| 2010/0327885 A1 | 12/2010 | Ziolkowski et al. | |
| 2011/0012601 A1 | 1/2011 | Hobbs et al. | |
| 2011/0103179 A1 | 5/2011 | Vageskar et al. | |

(Continued)

FOREIGN PATENT DOCUMENTS

| EP | 2048521 A2 | 4/2009 |
|---|---|---|
| EP | 2352040 A2 | 3/2011 |

(Continued)

OTHER PUBLICATIONS

Johan Mattsson, et al., "Error Analysis and Capability Modelling for Towed Streamer Electromagnetics," First Break, Aug. 2012, pp. 91-96, vol. 30.

(Continued)

*Primary Examiner* — Daniel L Murphy

(57) ABSTRACT

Disclosed are methods and systems for depth control of a sensor streamer. An example embodiment comprises a method for depth control of a sensor streamer. The example method may comprise towing the sensor streamer in a body of water; measuring noise levels of one or more signals generated on the sensor streamer; and adjusting depth of the sensor streamer at one or more spaced apart locations in response to the measured noise levels.

23 Claims, 4 Drawing Sheets

(56) References Cited

U.S. PATENT DOCUMENTS

| | | |
|---|---|---|
| 2011/0182138 A1 | 7/2011 | Sudow et al. |
| 2011/0242940 A1 | 10/2011 | Sudow et al. |
| 2011/0279120 A1 | 11/2011 | Sudow et al. |
| 2011/0317514 A1 | 12/2011 | Sudow et al. |
| 2012/0002502 A1 | 1/2012 | Hillesund et al. |
| 2012/0026829 A1 | 2/2012 | Hegna |
| 2012/0082001 A1 | 4/2012 | Welker et al. |

FOREIGN PATENT DOCUMENTS

| | | |
|---|---|---|
| EP | 2352040 A2 | 8/2011 |
| GB | 2342081 A | 5/2000 |
| WO | WO2010077970 A2 | 7/2010 |
| WO | WO2012044479 A2 | 4/2012 |

OTHER PUBLICATIONS

Johan Mattsson, et al., "Towed Streamer EM. The Challenges of Sensitivity and Anisotropy" First Break, Jun. 2013, pp. 155-159, vol. 31.

Chris Anderson, et al., "An Integrated Approach to Marine Electromagnetic Surveying Using a Towed Streamer and Source" First Break, May 2010, pp. 71-75, vol. 28.

United Kingdom Search Report, mailing date: Oct. 11, 2013.

Australian Patent Examination Report No. 1 issued in patent application No. 2013202468, mailed on May 13, 2014, 5 pages.

GB Intellectual Property Office Search Report for Application No. GB1307307.7 dated Nov. 11, 2015.

* cited by examiner

METHODS AND SYSTEMS FOR NOISE-BASED STREAMER DEPTH PROFILE CONTROL

BACKGROUND

Certain types of marine geophysical surveying, such as seismic or electromagnetic surveying, include towing an energy source at a selected depth in a body of water. One or more geophysical sensor streamers also may be towed in the water at selected depths. The streamers are essentially long cables having geophysical sensors disposed thereon at spaced apart locations. Actuation of the energy source emits an energy field into the body of water. The energy field interacts with the rock formations below the water bottom with changes in the energy field due to this interaction detected by the geophysical sensors positioned on the streamers. The detected energy is used to infer certain properties of the subsurface rock, such as structure, mineral composition and fluid content, thereby providing information useful in the recovery of hydrocarbons.

For certain types of surveying, it can be important that a sensor streamer is maintained as close as possible to a selected depth profile in the water. For example, a strong source of noise in electromagnetic surveying is induction noise due to streamer movement. Sources of noise in seismic surveying may include vibration, turbulence, and strumming. The noise levels increase when the sensor streamer is unbalanced or exposed to excessive forces, as in the case when the streamer is towed at a slant angle, which may not be the path of least resistance in some instances. Accordingly, the noise levels may be reduced by maintaining the sensor streamer at a substantially constant depth, thereby keeping the streamer as level as possible.

Devices commonly used to regulate streamer depth include depth regulators. In one example, the depth regulators commonly referred to as "birds" may be equipped with variable-incidence wings that are rotatably fixed onto the sensor streamer. The wings allow the birds to be turned about the longitudinal axis of the streamer so that a hydrodynamic force in any given direction about the longitudinal axis of the streamer is obtained. Often, such depth regulators are used in conjunctions with pressure sensors capable of generating a signal related to depth. Typically, pressure sensors used in geophysical surveying can be calibrated to a precision ranging from about 0.1% to about 0.5% of the full scale range of the sensor. The lowest scale pressure sensor used for towed electromagnetic surveying may be in the 20 bar range, for example, resulting in an uncertainty of up to 1 meter in depth. When approaching towing depth of about 500 to about 1,000 meters or greater as can be used in some deep tow applications, pressure sensors in the 100 bar or even 200 bar range may be used having uncertainties in the range of about 5 to about 10 meters. With this uncertainty in the depth measurements, the depth of the depth regulators may be not be substantially constant even when each depth regulator has the same set point, thereby causing increased noise in the geophysical sensor signals.

Accordingly, there is a need for improved methods and systems for controlling depth profile in geophysical surveys such that towing noise may be reduced.

BRIEF DESCRIPTION OF THE DRAWINGS

These drawings illustrate certain aspects of some of the embodiments of the present invention and should not be used to limit or define the invention.

DETAILED DESCRIPTION

Disclosed herein are systems and methods for controlling the depth profile of marine geophysical sensor streamers as they are towed in a body of water. In accordance with example embodiments, the depth of the geophysical sensor streamer may be adjusted at one or more spaced apart locations in response to signal noise such that the signal noise levels may be reduced. One of the many potential advantages of the systems and methods of the present invention, only some of which are disclosed herein, is that by adjusting the depth of the sensor streamer to reduce signal noise levels, the sensor streamer may be positioned at a selected depth profile, such as one that is substantially level. In this manner, embodiments of the present invention may provide a sensor streamer that more precisely follows the path of least resistance as it is towed through the water, thereby reducing induction, vibration, turbulence, and strumming noise due to streamer movement.

Figure 1:
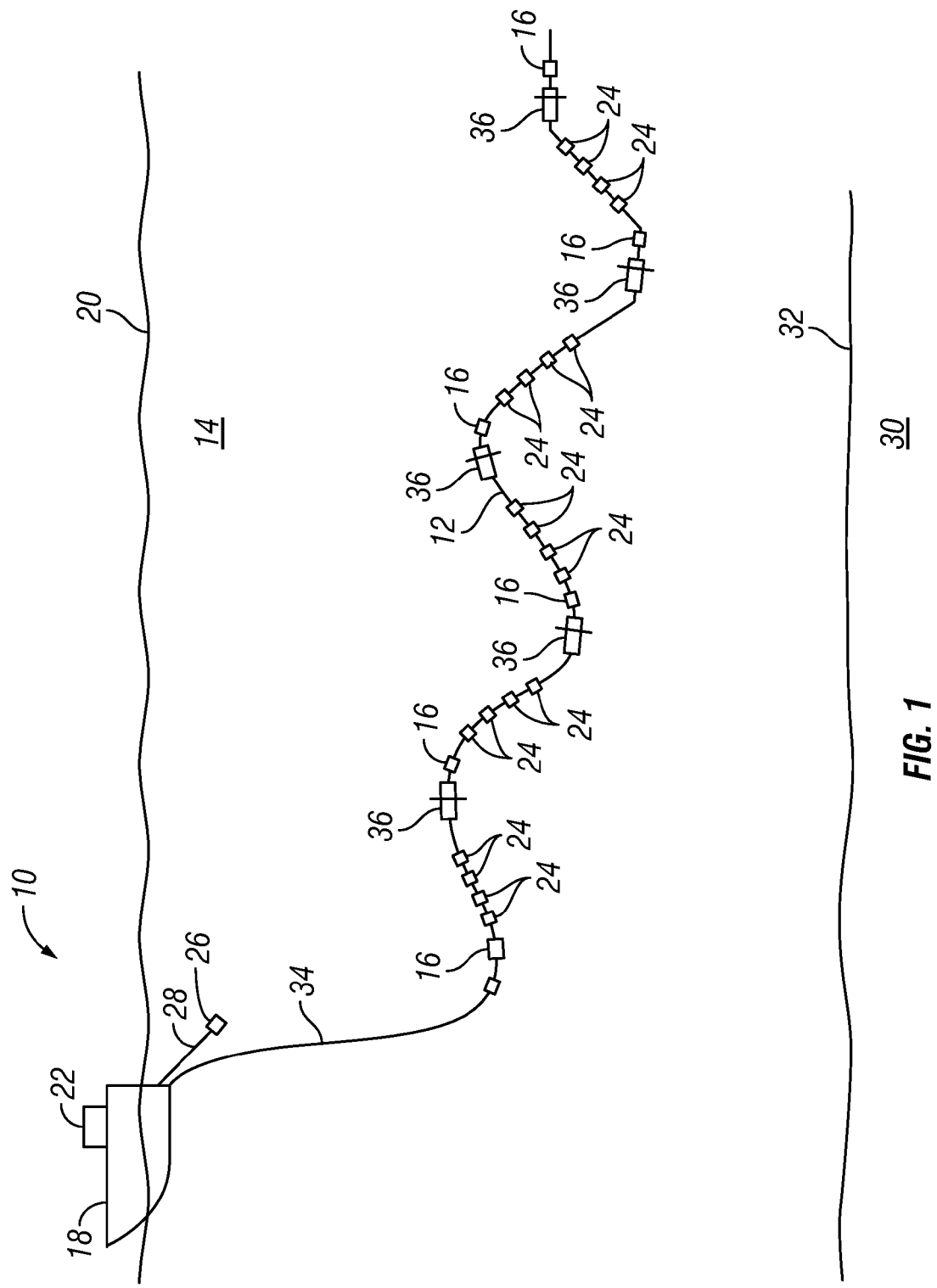
FIG. 1 is a schematic diagram illustrating a geophysical survey system in accordance with example embodiments.
Figure 2:
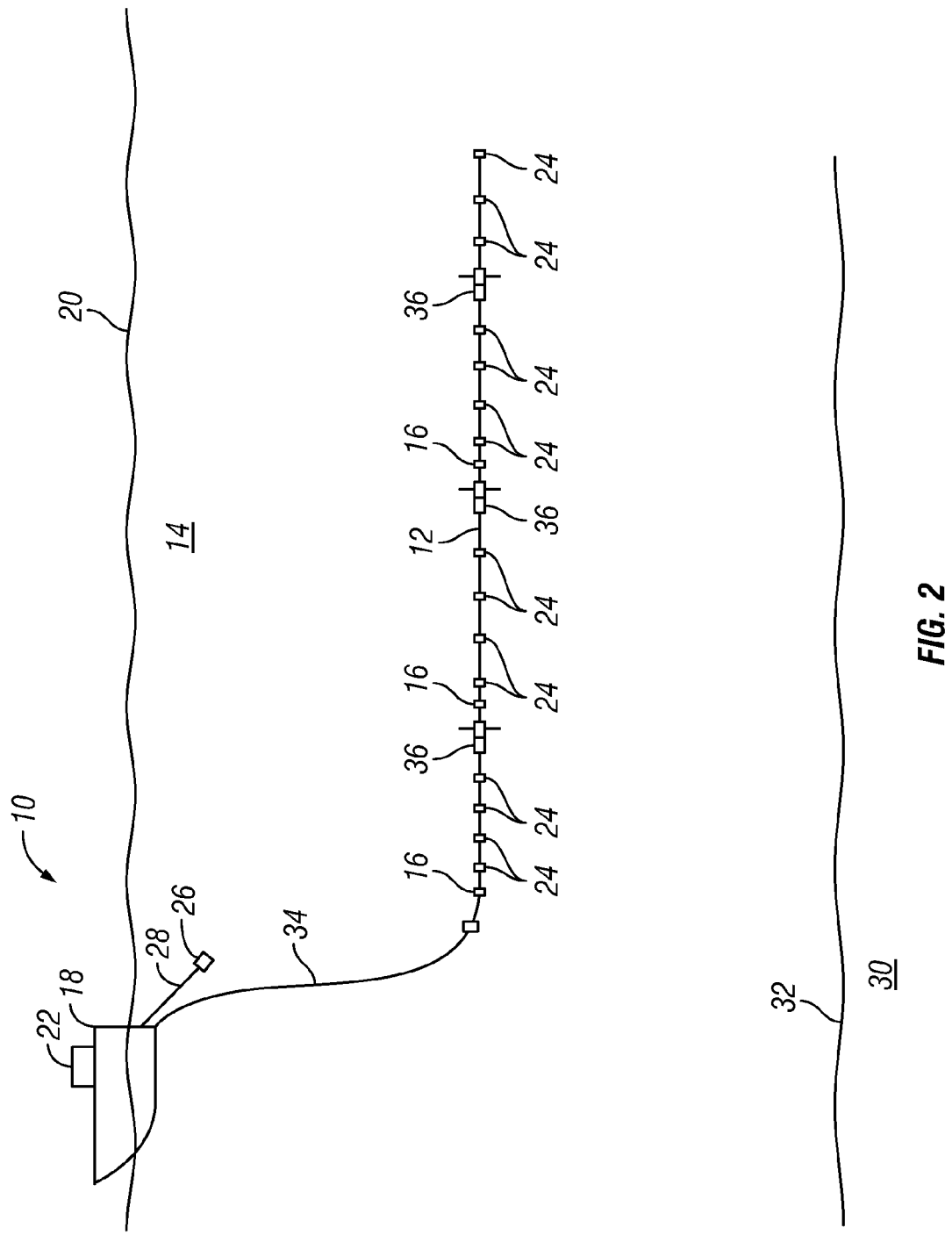
FIG. 2 is a schematic diagram illustrating a geophysical survey system in accordance with example embodiments.

FIGS. 1 and 2 illustrate a marine geophysical survey system 10 in which a sensor streamer 12 may be towed through a body of water 14 in accordance with embodiments of the present invention. As shown in FIG. 1, the uncertainty in measurement in pressure sensors 16 may cause the sensor streamer 12 to have a depth profile that is not level. By adjusting the depth of the sensor streamer 12 at one or more spaced apart locations in response to signal noise, the sensor streamer 12 may be positioned at a depth profile that is substantially level with respect to the surface 20 of the body of water 14, as best seen in FIG. 2.

In the illustrated embodiment, the system 10 may include a survey vessel 18 that moves along the surface 20 of the body of water 14, which may be a lake or ocean, for example. The survey vessel 18 may include equipment, shown generally at 22 and collectively referred to herein as "recording system." By way of example, the recording system 22 may include one or more devices (none shown separately) for determining geodetic position of the survey vessel 18 (e.g., a global positioning system satellite receiver signal), detecting and making a time indexed record of signals generated by each of a plurality of geophysical sensors 24 (e.g., a geophysical data acquisition system 40 on FIG. 4), and/or for actuating one or more enemy sources 26 at selected times. The recording system 22 may also include a streamer depth control system (e.g., a depth control system 42 on FIG. 4) which, for example, may use measured noise levels to selectively adjust depth of the sensor streamer 12. The one or more energy sources 26 may be towed from the survey vessel 18 and may be any selectively actuatable sources suitable for subsurface geophysical surveying, including without limitation seismic air guns, water guns, vibrators or arrays of such devices, or one or more electromagnetic field transmitters. A source cable 28 may be used to connect the one or more energy sources 26 to the survey vessel 18.

In the present example, a plurality of geophysical sensors 24 may be disposed at spaced apart locations along the sensor streamer 12. The geophysical sensors 24 may be, without limitation, seismic sensors such as geophones, hydrophones, or accelerometers, or electromagnetic field sensors, such as electrodes or magnetometers. The geophysical sensors 24 may generate response signals, such as electrical or optical signals, in response to detecting energy emitted from the one or more energy sources 26 after the energy has interacted with rock formations 30 below the water floor 32.

With continued reference to FIGS. 1 and 2, the sensor streamer 12 may be connected to the survey vessel 18 by way of a lead-in line 34. In some embodiments, the lead-in line 34 may communicate power and/or signals between the recording system 22 and the various electric components of the sensor streamer 12. The lead-in line 34 may also transmit towing force from the survey vessel 18 to the sensor streamer 12. In an embodiment, the sensor streamer 12 may be formed by coupling a plurality of streamer segments end-to-end, for example, as explained in U.S. Pat. No. 7,142,481, which is incorporated herein by reference. The streamer segments may be coupled by assembling termination plates (not shown) at each end of each streamer segment. While only a single sensor streamer 12 is illustrated on FIGS. 1-2, two or more sensor streamers 12 may be towed through the body of water 14 in accordance with embodiments of the present invention.

In the illustrated embodiment, the sensor streamer 12 may be towed from the survey vessel 18 and may include a plurality of depth regulators 36 at spaced apart locations along the length of the sensor streamer 12. In one embodiment, the depth regulators 36 may be disposed at selected couplings between streamer segments. The depth regulators 36 may be deployed, for example, to regulate streamer depth so that the sensor streamer 12 may be kept at a selected depth profile, for example, as level as possible while towed through the body of water 14. However, due to uncertainties in depth measurements, the depth profile of the sensor streamer 12 may not be substantially level even when the set depth values for the depth regulators 36 are the same, as best seen in FIG. 1. As will be discussed in more detail below, embodiments of the present invention may position the sensor streamer 12 at a selected depth profile (e.g., that is substantially level as shown on FIG. 2) by adjusting the depth of the sensor streamer 12 at one or more spaced apart locations in response to signal noise. The depth regulators 36 may be any of a variety of different devices suitable for regulating streamer depth, including "birds" having variable-incidence wings. One example of a depth regulator 36 that may be coupled between streamer segments is described in U.S. Patent Publication No. 2008/0192570, which is incorporated herein by reference. Another example of a depth regulator 36 is described in U.S. Pat. No. 6,144,342. In some embodiments, the depth regulators 36 may also be configured to additionally regulate tilt angle of the sensor streamer 12, for example, so that the sensor streamer 12 exhibits a substantially constant tilt angle along the entire length of the streamer.

The sensor streamer 12 may also include a plurality of depth sensors 16 disposed at spaced apart locations along the length of the sensor streamer 12. In some embodiments, the depth sensors 16 may be pressure sensors configured to provide a signal related to depth. For example, the depth sensors 16 may be configured to measure pressure in the body of water 14, which may provide an approximate indication of depth. As illustrated, the depth sensors 16 may be disposed on the sensor streamer 12 in some embodiments. In alternative embodiments, the depth sensors 16 may each be disposed in a corresponding one of the depth regulators 36.

As previously mentioned, embodiments of the present invention may be used to control the depth profile of the sensor streamer 12 as it is towed through the body of water 14. For example, embodiments may include adjusting the depth of the sensor streamer 12 at one or more spaced apart locations in response to measured signal noise levels to cause a reduction in the measured signal noise levels. By adjusting the depth to reduce signal noise levels, the sensor streamer 12 may be positioned at a depth profile that is more level. For example, the sensor streamer 12 may be positioned at a depth profile that is substantially level. In this manner, the sensor streamer 12 may be aligned, for example, at the depth profile with the least signal noise. For example, the depth profile of the sensor streamer 12 may be controlled so that variations in the streamer depth profile are less than 1 meter per 1000 meters of streamer length, for example, thereby resulting in decreased noise. In some embodiments, the depth regulators 36 may be used to generate vertical force (e.g., upward or downward force) that adjusts the depth of the streamer 12. If desired to deflect adjust the depth of the sensor streamer 12 downward at a particular location, one of the depth regulators 36 proximate the particular location may be caused to generate downward force, thus forcing down the sensor streamer 12. Conversely, if desired to deflect the sensor streamer 12 upward at a particular location, one of the depth regulators 36 proximate the particular location may be caused to generate upward force, thus forcing up the sensor streamer 12.

One example for controlling the depth profile of the sensor streamer 12 is illustrated by FIGS. 1 and 2. As shown by FIG. 1, the uncertainty in measurement in pressure sensors 16 may cause the sensor streamer 12 to have a depth profile that is not level while the sensor streamer 12 is towed through the body of water 14. In accordance with embodiments of the present invention, the depth of the sensor streamer 12 may be adjusted at one or more spaced apart locations in response to signal noise to cause a reduction in the signal noise. For example, the depth of each of the depth regulators 36 may be adjusted, either up or down, thus adjusting the depth of the sensor streamer 12 proximate each of the depth regulators 36. In this manner, depth profile of the sensor streamer 12 may be controlled such that the sensor streamer 12 is in a generally straight line as it is towed through the body of water 14, as best seen in FIG. 2, thereby resulting in reduced signal noise.

Figure 3:
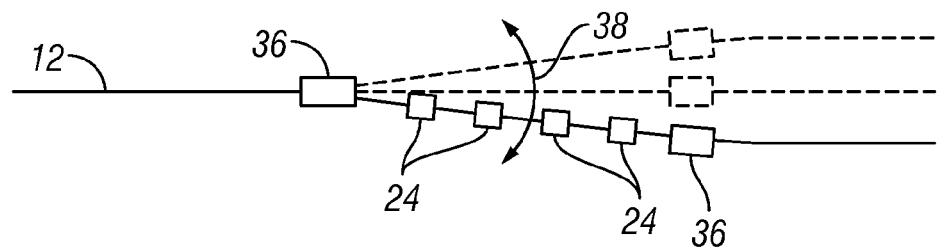
FIG. 3 is a schematic diagram illustrating depth adjustment of a depth regulator with respect to an adjacent depth regulator in accordance with example embodiments.

FIG. 3 schematically shows one example method of adjusting position of a sensor streamer 12 for an adjacent pair of the depth regulators 36. As illustrated, a pair of the depth regulators 36 may be positioned at spaced apart locations on the sensor streamer 12. Geophysical sensors 24 may also be positioned on the sensor streamer 12 at spaced apart locations. In the illustrated embodiment, the geophysical sensors 24 are shown disposed between the adjacent pair of the depth regulators 36. An example method for depth control may include setting the absolute depth of the sensor streamer 12 at the geophysical sensors 24. The method further may comprise measuring noise level across the sensor streamer 12 between the adjacent pair of the depth regulators 36. For example, the measured noise levels may be from the response signal generated by the geophysical sensors 24 disposed between the adjacent pair of the depth regulators 36. The example method for depth control further may include adjusting the depth of the sensor streamer 12 at one of the adjacent pair of the depth regulators 36 in response to the measured noise levels such that the noise levels may be minimized. For example, the depth of one of the depth regulators 36 may be adjusted up or down, as indicated by arrow 38. The example method further may include fixing the relative position of the adjacent pair of the depth regulators 36. In some embodiments, the relative position may be set at the position in which the measured noise levels across the section of the sensor streamer between the depth regulators 36 were at a minimum.

Figure 4:
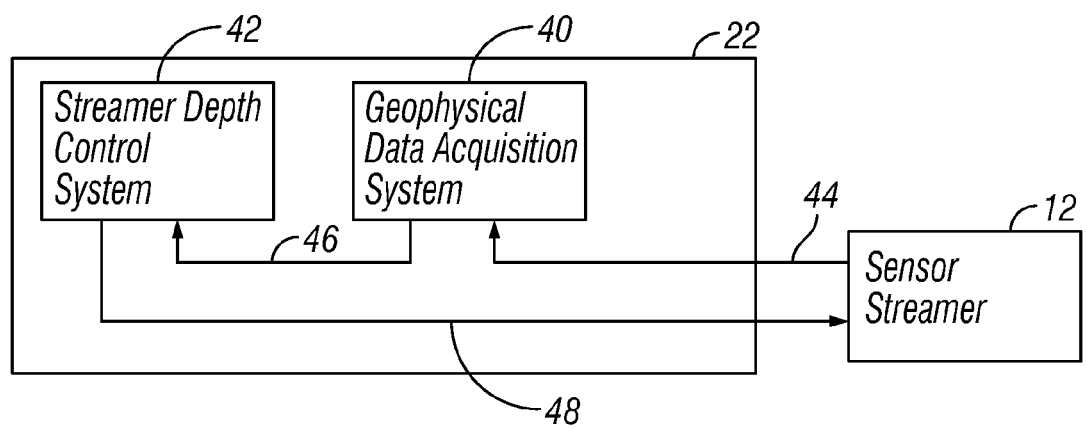
FIG. 4 is a schematic diagram illustrating circuitry that may be used with the depth regulators to control the depth of the sensor streamer in accordance with example embodiments.

FIG. 4 shows one example of circuitry that may be used with one of the depth regulators 36 (e.g., shown on FIGS. 1 and 2) to control the depth of the sensor streamer 12 at the corresponding one of the depth regulators. As illustrated, the recording system 22 (which may be positioned on vessel 18 as shown on FIGS. 1 and 2) may include a geophysical data acquisition system 40, which may include one or more devices (e.g., processor, memory, input/output devices, etc.) for receiving and making a time indexed record of signals from the sensor streamer 12. The geophysical data acquisition system 40 may also include one or more devices for measuring noise levels on the sensor streamer 12. In some embodiments, the geophysical data acquisition system 40 may be in signal communication with the sensor streamer 12 via one or more signal lines 44 as part of the ordinary power and signal cabling in the sensor streamer 12 in a manner that should be apparent to one of ordinary skill in the art. Alternatively, the geophysical data acquisition system 40 may be in wireless communication with the sensor streamer 12. The geophysical data acquisition system 40 may receive, as input, signals from the sensor streamer 12. For example, the geophysical data acquisition system 40 may receive as input signals from each of the sensors on the sensor streamer 12 (e.g., geophysical sensors 24, depth sensors 16, etc.). In some embodiments, the geophysical data acquisition system 40 may receive signals that include geophysical data sensed by the geophysical sensors 24 (e.g., shown on FIGS. 1 and 2). The geophysical data acquisition system 40 may also receive signals from the depth sensors 16 (e.g., shown on FIGS. 1 and 2) on the sensor streamer 12 corresponding to the water depth of the corresponding one of the depth regulators 36. The geophysical data acquisition system 40 may also receive signals from a position-location sensor (not shown), which may be a global satellite receiver or an acoustic range finder (e.g., used to estimate distance to adjacent streamers).

As illustrated by FIG. 4, the recording system 22 further may include a streamer depth control system 42, which may include a processor, memory, and input/out devices, for example. The streamer depth control system 42 may be in signal communication with the geophysical data acquisition system 40, for example, by way of one or more signal lines 46. Alternatively, the streamer depth control system 42 may be in wireless communication with the geophysical data acquisition system 40. From the geophysical data acquisition system 40, the depth control system 42 may receive the measured signal noise levels on the sensor streamer 12. The streamer depth control system 42 may also be in signal communication with the sensor streamer 12, for example, by way of one or more signal lines 48. Alternatively, the streamer depth control system 42 may be in wireless communication with the sensor streamer 12. In some embodiments, the streamer depth control system 42 may send signals to the sensor streamer 12 for controlling the absolute and relative depth of the depth regulators 36 (e.g., shown on FIGS. 1 and 2) positioned on the sensor streamer 12. In some embodiments, the streamer depth control system 42 may send a control signal to cause the depth regulators 36 to move a section of the sensor streamer 12 to a selected depth. In one particular example, the streamer depth control system 42 may send a control signal to selectively operate a particular one of the depth regulators 36, for example, to either raise or lower sections of the sensor streamer 12. In some embodiments, the streamer depth control system 42 may be configured to use measured signal noise levels to selectively operate the associated depth regulator 36 to cause a reduction in the measured signal noise levels. As previously described, the streamer depth control system 42 may move one of the depth regulators 36 until the measured signal noise levels have been minimized. If the signal noise levels cannot be minimized, the particular one of the depth regulators 36 may be set at its initial depth setting.

While the streamer depth control system 42 is described herein as a component of the recording system 22 on the survey vessel 18, it should be understood that the streamer depth control system 42 does not necessarily have to be located on the survey vessel 18. In some embodiments, the streamer depth control system 42 may include one or more controllers that may be positioned on the sensor streamer 12. Each of the controllers that may be positioned on the sensor streamer may include, for example, a processor, memory, and/or input/output devices. The controllers may receive measured noise signals and selectively operate one or more of the depth regulators 36 to raise or lower sections of the sensor streamer 12.

Figure 5:
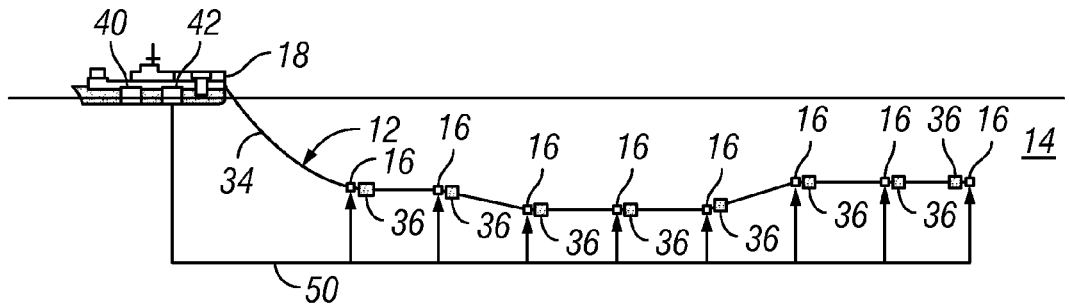
FIG. 5 is a schematic diagram illustrating positioning a sensor streamer at a selected depth in accordance with example embodiments.

With reference now to FIGS. 5-8, one example method for depth control of sensor streamer 12. As shown by FIG. 5, the sensor streamer 12 may be generally positioned at a selected depth. For example, the survey vessel 18 may tow the sensor streamer 12 through the body of water 14 at the selected depth, for example, using winches to control the length of lead-in line 34. In positioning the sensor streamer 12 at the selected depth, the streamer depth control system 42 may send a control signal 50 that sets the absolute depth of the depth regulators 36 thereby causing the depth regulators 36 to position the sensor streamer 12 at the selected depth. In some embodiments, the selected depth may be the selected survey depth. However, as discussed above and shown by FIG. 5, the sensor streamer 12 may have a depth profile that is not level due to, for example, uncertainties in the measurements of the depth sensors 16.

Figure 6:
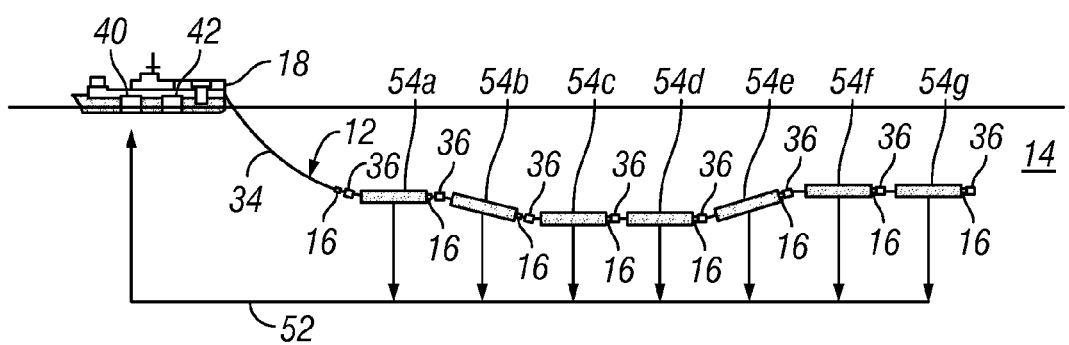
FIG. 6 is a schematic diagram illustrating measuring noise levels on the sensor streamer in accordance with example embodiments.

As shown by FIG. 6, one or more signals 52 may be generated on the sensor streamer 12 and transmitted to the data acquisition system 40. In accordance with present embodiments, the noise levels from one or more signals 52 may be measured. The measured noise levels may be elevated, for example, due to the towing of the sensor streamer 12 at a depth profile that is not level. The noise levels may be measured using the geophysical sensors 24 (e.g., FIG. 1) for detecting the geophysical response or one or more auxiliary sensors specifically for measuring the noise, or a combination thereof. Any suitable technique for measuring noise levels from the signals 52 may be used in the embodiments of the present invention. Examples of suitable techniques for measuring noise levels are described in more detail in U.S. Pat. No. 7,671,598, U.S. Patent Publication No. 2010/0017156, and U.S. Patent Publication. No. 2012/026829, the disclosures of which are incorporated herein by reference. In some embodiments, the measured noise levels may comprise an estimated noise level in the one or more signals 52. Estimated noise levels may be used, for example, where the noise acquisition run may be shorter than normally used for a complete characterization of the noise. In one embodiment, the signals 52 may be the response signals generated by one or more of the geophysical sensors 24 (e.g., shown on FIGS. 1 and 2) on the sensor streamer 12. For example, the signals 52 may be the electromagnetic field signals generated by the geophysical sensors 24 in response to electromagnetic field measurements. In alternative embodiments, the signals 52 may be from other measurements taken on the sensor streamer 12, such as accelerometer signals, velocity signals, pressure signals, and depth signals.

In some embodiments, the noise levels may be measured across one or more streamer segments 54a-54g on the sensor streamer 12. For example, the noise levels may be measured across streamer segments 54a-54g between two adjacent depth regulators 36. In some embodiments, the noise levels may be measured proximate one of the depth regulators 36. For example, the noise levels may be measured up to about 300 meters or more from the corresponding one of the depth regulators 36. In one embodiment, the noise levels may be measured up to about 200 meters away from the corresponding one of the depth regulator 36. In another embodiment, the noise levels may be measured from about 150 meters to about 200 meters away from the corresponding one of the depth regulators 36.

Figure 7:
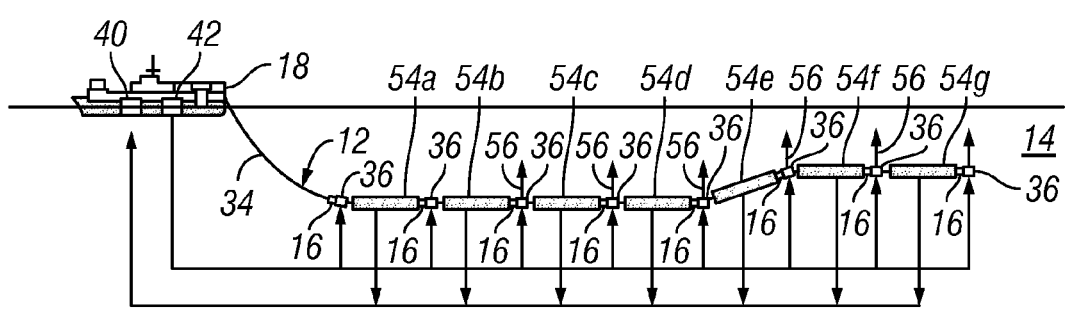
FIG. 7 is a schematic diagram illustrating selective operation of the depth regulators in response to measured noise levels in accordance with example embodiments.

As shown by FIG. 7, the depth of the sensor streamer 12 at one or more spaced apart locations may be adjusted in response to the measured noise levels. For example, the depth may be adjusted upward as indicated by arrows 56. The noise levels from one or more signals 52 generated on the sensor streamer 12 may then be re-measured. In accordance with present embodiments, the measured noise levels may be reduced by the depth adjustment. In some embodiments, the depth may be adjusted until the measured noise levels are at a minimum. For example, the depth may be adjusted until the depth is within depth 2 feet or less of a noise minimum. In some embodiments, the depth of the sensor streamer 12 at one or more of the depth regulators 36 may be adjusted. For example, the relative depth of the sensor streamer 12 at one or more of the depth regulators 36 may be adjusted with respect to adjacent depth regulators 36. The depth may be adjusted, for example, an amount from about 1 times to about 2 times the limits of the uncertainty of the depth sensors 16. The particular one of the depth regulators 36 may then be set at the depth at which the noise levels are minimized. In some embodiments, the depth of the sensor streamer 12 at two or more of the depth regulators 36 may be adjusted in response to the measurement at the same time. However, to avoid excessive noise during optimization only a subset of the depth regulators 36 may be adjusted at the same time. For example, the subset may include every third of the depth regulators 36, every fourth of the depth regulators 36, and the like. In some embodiments, the relative position of the one of the depth regulators 36 at which the depth is adjusted may be fixed with respect to an adjacent one of the depth regulators 36. In the case of measuring the noise levels across a section of the sensor streamer 12 between two adjacent depth regulators 36, for example, the depth of one of the adjacent depth regulators 36 may be adjusted. By way of further example, in the case of measuring noise proximate one of the depth regulators 36, the depth of the corresponding one of the depth regulators 36 proximate the measurement may be adjusted.

Figure 8:
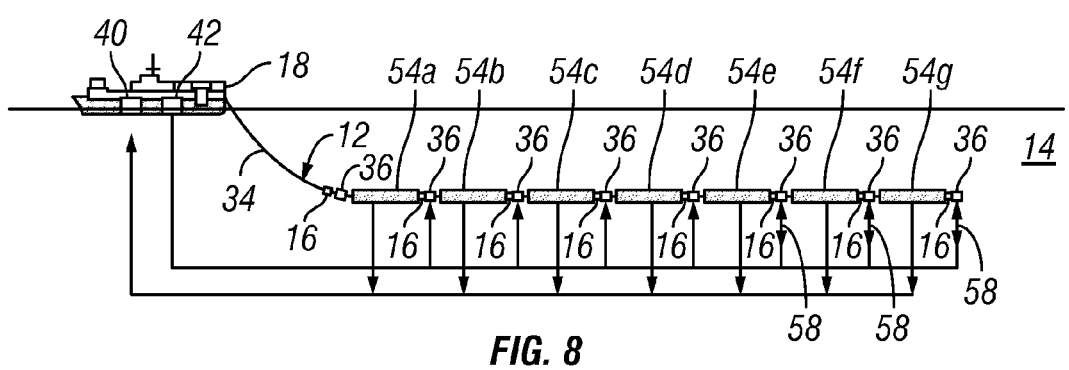
FIG. 8 is another schematic diagram illustrating selective operation of the depth regulators in response to measured noise levels in accordance with example embodiments.

As shown by FIG. 8, the adjustment of the depth of the sensor streamer 12 at the one or more spaced apart locations in response to measured noise levels may be repeated. For example, the depth may be adjusted downward as indicated by arrows 58. In some embodiments, there may be a period of from about 5 to about 15 minutes between depth adjustments so that the sensor streamer 12 may have a time to settle at its new position before a subsequent depth adjustment may be made. In some embodiments, the measuring and adjusting steps may be repeated until the all relative positions between the depth regulators 36 have been fixed. If the signal noise levels cannot be minimized, the particular one of the depth regulators 36 may be set at its initial depth setting. In this manner, the sensor streamer 12 may be aligned at a depth profile that is substantially level, thereby minimizing noise levels due to streamer movement.

Those of ordinary skill in the art, with the benefit of this disclosure, should appreciate that the methods and systems of the present invention should enable towing of marine geophysical sensor streamers with depth profiles that are substantially level. As described above, by adjusting the depth of the sensor streamer in response to signal noise, the sensor streamer may be positioned at a depth profile that is substantially level, thereby reducing signal noise caused by towing the sensor streamer through the water. In accordance with present embodiments, the methods and systems may be used to tow sensor streamers at a depth of at least about 5 meters. In some embodiments, the sensor streamers may be towed at a depth of about 5 meters to about 75 meters. In some embodiments, the sensor streamers may be towed a depth of at least about 25 meters and, alternatively, at least about 100 meters, for example, at a depth up to about 500 meters or more, in one embodiment. By way of example, the sensor streamers may be towed at a depth of from about 500 meters to about 1,000 meters.

If there is a conflict in the usages of a word or term in this specification and or more patent or other documents that may be incorporated herein by reference, the definitions that are consistent with this specification should be adopted for the purposes of understanding this invention.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee.

What is claimed is:

1. A method for depth control of a sensor streamer, comprising:
    towing the sensor streamer in a body of water;
    measuring noise levels of one or more signals generated on the sensor streamer; and
    adjusting depth of the sensor streamer at one or more spaced apart locations in response to the measured noise levels such that the sensor streamer is positioned at a depth profile that is more level.

2. The method of claim 1, wherein the sensor streamer is towed at a depth of at least about 100 meters.

3. The method of claim 1, wherein the one or more signals comprise an electromagnetic field signal.

4. The method of claim 1, wherein the measured noise levels are an estimate of the noise levels of the one or more signals.

5. The method of claim 1, wherein the noise levels are measured across one or more sections of the sensor streamer.

6. The method of claim 1, wherein the noise levels are measured across a section of the sensor streamer between adjacent depth regulators.

7. The method of claim 6, wherein the adjusting the depth causes a reduction in the measured noise levels such that the adjusted depth is within 2 feet of a noise minimum.

8. The method of claim 6, wherein the depth is adjusted at one of the adjacent depth regulators.

9. The method of claim 8, wherein a relative position of the adjacent depth regulators is fixed with respect to one another.

10. The method of claim 1, wherein adjusting the depth comprises generating vertical force with one or more depth regulators disposed on the sensor streamer.

11. The method of claim 1, wherein the depth of the sensor streamer is adjusted to cause the sensor streamer to have a depth profile that is substantially level with respect to a surface of the body of water.

12. A method for depth control of a sensor streamer, comprising:
towing the sensor streamer in a body of water, wherein the sensor streamer comprises depth regulators at a first set of spaced apart locations along the sensor streamer and geophysical sensors at a second set of spaced apart locations along the sensor streamer;
measuring noise levels of one or more sensor signals from the geophysical sensors; and
sending control signals to one or more of the depth regulators to selectively adjust relative depth of the particular depth regulators with respect to adjacent depth regulators in response to the measured noise levels.

13. The method of claim 12, wherein the sensor streamer is towed at a depth of at least about 100 meters.

14. The method of claim 12, further comprising fixing relative positions of the depth regulators in response to the measured noise levels.

15. The method of claim 14, wherein the relative positions are fixed at a position in which the measured noise is minimized.

16. The method of claim 12, wherein the geophysical sensors comprise electromagnetic sensors.

17. A marine geophysical survey system, comprising:
a survey vessel;
a sensor streamer towed from the survey vessel, wherein the sensor streamer comprises geophysical sensors at a first set of spaced apart locations on the sensor streamer, and depth regulators at a second set of spaced apart locations on the sensor streamer;
a geophysical data acquisition system in signal communication with the geophysical sensors, wherein the geophysical data acquisition system is configured to measure noise levels in signals from the geophysical sensors; and
a depth control system in signal communication with the depth regulators, wherein the depth control system is configured to selectively operate one or more of the depth regulators in response to the measured noise levels such that the depth of the particular depth regulators is adjusted with respect to adjacent depth regulators.

18. The system of claim 17, wherein the geophysical sensors comprise electromagnetic field sensors.

19. The system of claim 17, wherein the depth control system is configured to not operate adjacent depth regulators at the same time in response to measured noise level.

20. The system of claim 17, further comprising one or more energy sources towed from the survey vessel.

21. A method for depth control of a sensor streamer, comprising:
towing the sensor streamer in a body of water;
measuring noise levels of one or more signals generated on the sensor streamer; and
adjusting depth of the sensor streamer at one or more spaced apart locations in response to the measured noise levels, wherein the adjusting the depth causes a reduction in the measured noise levels such that the adjusted depth is within 2 feet of a noise minimum.

22. A method for depth control of a sensor streamer, comprising:
towing the sensor streamer in a body of water, wherein the sensor streamer comprises depth regulators at a first set of spaced apart locations along the sensor streamer and geophysical sensors at a second set of spaced apart locations along the sensor streamer;
measuring noise levels of one or more sensor signals from the geophysical sensors;
sending control signals to one or more of the depth regulators to adjust relative depth of the particular depth regulators; and
fixing relative positions of the depth regulators in response to the measured noise levels.

23. The method of claim 22, wherein the relative positions are fixed at a position in which the measured noise is minimized.

* * * * *